UNITED STATES PATENT OFFICE.

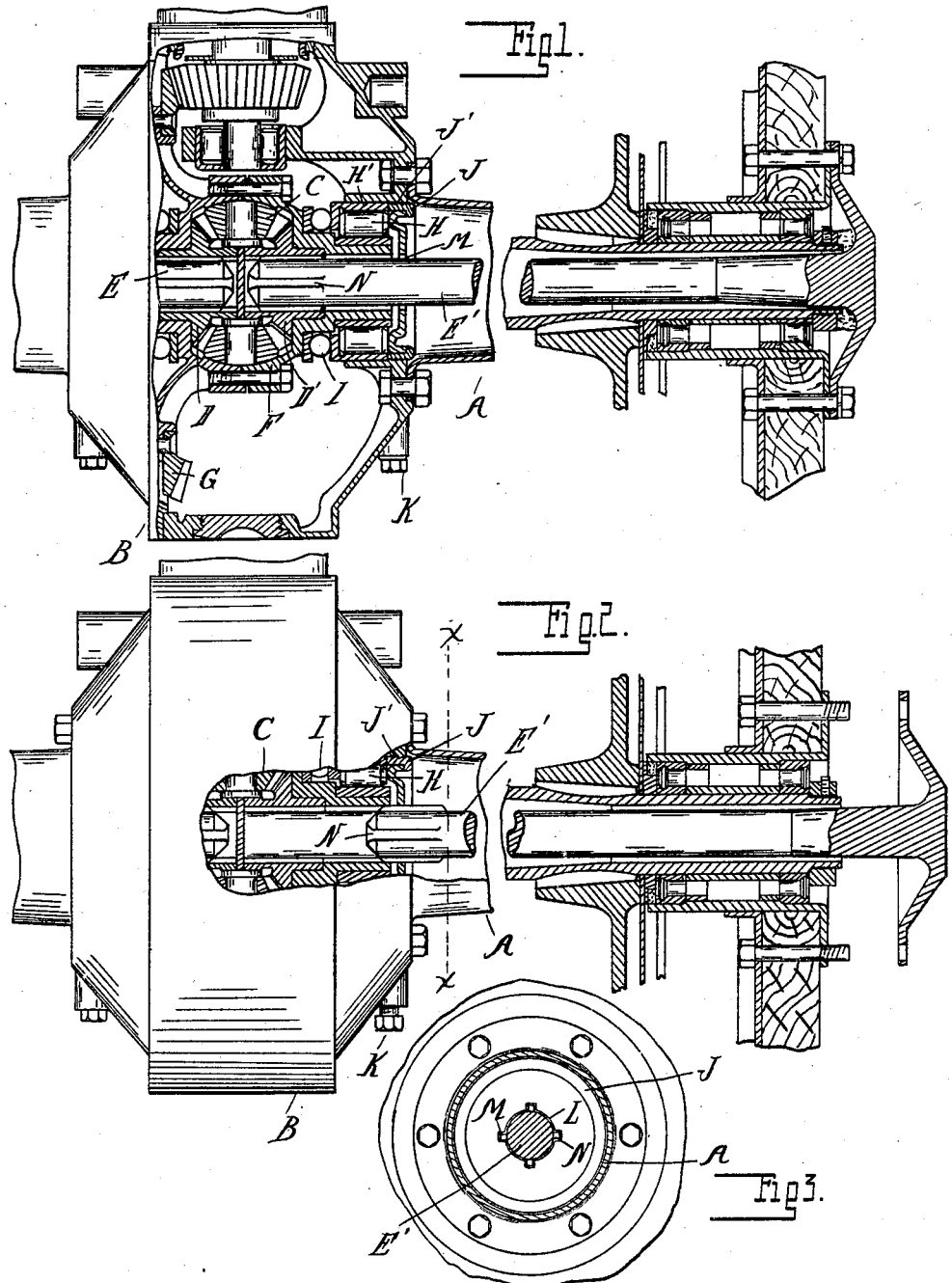

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

BEARING-ADJUSTING MEANS FOR AXLES.

1,050,986.  Specification of Letters Patent.  Patented Jan. 21, 1913.

Application filed March 1, 1912. Serial No. 680,983.

*To all whom it may concern:*

Be it known that I, EMIL A. NELSON, a citizen of the United States of America, residing at Detroit, in the county of Wayne and State of Michigan, have invented certain new and useful Improvements in Bearing-Adjusting Means for Axles, of which the following is a specification, reference being had therein to the accompanying drawings.

The invention relates to axles and more particularly to the drive axles of motor vehicles of that type in which a compensating or differential gearing is employed for communicating the drive to a divided shaft, the wheels being driven respectively by the sections of said shaft. With such constructions it is usual to locate the differential gearing in a housing which contains journal and end thrust bearings for each of the bevel gears. To adjust these bearings it is necessary to remove the axle section and to insert in place thereof a suitable adjusting tool.

The present invention is designed to simplify the operation of adjustment by a construction in which the axle section itself may be used as the adjusting tool as hereinafter set forth.

In the drawings,—Figure 1 is a longitudinal section through the axle as in position for use; Fig. 2 is a similar view showing the manner of adjusting the bearing by the axle section; and Fig. 3 is a cross section on line $x$—$x$ of Fig. 2.

A is the axle housing having the central enlargement B which contains a compensating gearing of any suitable construction including the drive bevel pinions C and the bevel gear wheels D and D' in engagement therewith and respectively communicating motion to the shaft sections E and E'. The gear wheels D and D' are independently revolubly mounted within a frame member F which also carries the drive pinions C and is itself revolved by a bevel gear wheel G mounted thereon. The member F is journaled within the housing B preferably by engaging roller bearings H therein, while the end thrust is provided for by ball bearings I shown as arranged at the inner end of each roller bearing. These thrust bearings are adjusted by members J each of which bears against the sleeve member H' and which have a threaded engagement J' with the housing member B. Thus by rotating the member J all lost motion in the thrust bearing may be taken up and the parts may be locked in this position by suitable means such as the clamping bolts K. Inasmuch however, as the member J is within the housing B it is inaccessible excepting by some instrument introduced from the end of the axle housing, and heretofore it has been necessary to first remove the axle shaft section and to then introduce the adjusting instrument. This is avoided in the present construction by utilizing the axle shaft section for an adjusting tool, the construction being preferably as follows: The member J is provided with a central aperture L of sufficient diameter for the passage of the shaft section E and is also notched at M to form a wrench hold. The sections E and E' of the axle shaft have formed at their inner ends the projecting keys N by which said sections are coupled to their respective pinions D and D' and these keys N are adapted to engage the notches M in the member J. Thus to adjust the bearing the clamping bolt K is loosened, the axle section E detached from the wheel and drawn outward until the key N engages the notch M, after which a slight rotation will effect the necessary adjustment, the clamp K is then tightened and the axle section returned to its normal position.

The construction above described is one which utilizes parts which are essential to the normal operation of the mechanism for effecting the adjustment of the bearing and avoids the necessity of completely detaching the axle and providing an independent tool for adjustment.

What I claim as my invention is:

1. The combination with drive mechanism and a shaft actuated thereby, of means for adjusting said mechanism through the medium of said shaft.

2. The combination with drive mechanism and an axle actuated thereby, of means for adjusting said mechanism through the medium of said axle, engageable with the axle by a longitudinal adjustment of the latter.

3. The combination with drive mechanism and an axle actuated thereby, of an end thrust bearing for said mechanism, and a rotatable member for adjusting said bearing, said axle being engageable with said adjustable member by a longitudinal movement of the axle.

4. The combination with a compensating gearing and an end thrust bearing therefor, of a detachable axle section driven by said compensating gearing, and a rotatively adjustable member for adjusting said bearing, said axle section being engageable with said rotatively adjustable member by a partial withdrawal of the axle from its normal position.

5. The combination with the axle casing, of a compensating gearing therein, and an axle section detachably engaging said compensating gearing, a bearing for said compensating gearing, a key on said axle section for coupling the same with said compensating gearing, and a member for adjusting said bearing notched for the passage of said key and adapted to be rotated by the key for adjustment.

In testimony whereof I affix my signature in presence of two witnesses.

EMIL A. NELSON.

Witnesses:
FRANK E. WATTS,
JOHN W. PETERSON.